United States Patent
Zhang et al.

(10) Patent No.: US 10,222,658 B2
(45) Date of Patent: Mar. 5, 2019

(54) ARRAY SUBSTRATE, DISPLAY PANEL AND DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Long Zhang, Xiamen (CN); Ting Zhou, Xiamen (CN); Qiong Song, Xiamen (CN); Poping Shen, Xiamen (CN); Chang-ho Tseng, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 47 days.

(21) Appl. No.: 14/852,407

(22) Filed: Sep. 11, 2015

(65) Prior Publication Data

US 2016/0187684 A1 Jun. 30, 2016

(30) Foreign Application Priority Data

Dec. 30, 2014 (CN) .......................... 2014 1 0839622

(51) Int. Cl.
*G02F 1/1343* (2006.01)

(52) U.S. Cl.
CPC .. *G02F 1/134309* (2013.01); *G02F 1/134363* (2013.01); *G02F 2001/134372* (2013.01)

(58) Field of Classification Search
None
See application file for complete search history.

(56) References Cited

U.S. PATENT DOCUMENTS

| | | | |
|---|---|---|---|
| 2008/0074602 A1* | 3/2008 | Arai | G02F 1/134363 349/146 |
| 2010/0079712 A1 | 4/2010 | Tanaka et al. | |
| 2010/0157228 A1 | 6/2010 | Sakurai et al. | |
| 2015/0116644 A1 | 4/2015 | Morishita et al. | |
| 2015/0212374 A1* | 7/2015 | Uejima | G02F 1/134309 349/43 |
| 2015/0219973 A1* | 8/2015 | Kawashima | G02F 1/133345 349/43 |

FOREIGN PATENT DOCUMENTS

| | | |
|---|---|---|
| CN | 101038403 A | 9/2007 |
| CN | 101515093 A | 8/2009 |
| CN | ZL2007101944922 C | 10/2009 |
| CN | 103529602 A | 1/2014 |
| WO | 2013168566 A1 | 11/2013 |

* cited by examiner

*Primary Examiner* — Richard H Kim
(74) *Attorney, Agent, or Firm* — Faegre Baker Daniels LLP (57) ABSTRACT

An array substrate, a display panel and a display device. The array substrate includes: a plurality of pixel units; an alignment layer covering the pixel units and having an alignment direction parallel to a plane of the array substrate; and a first electrode and a second electrode both disposed within each of the pixel units; where, the first electrode has at least one branch electrode, the branch electrode has a median electrode and an end electrode disposed at at least one end of the median electrode, an angle formed between the end electrode and the alignment direction is different from that formed between the median electrode and the alignment direction, and the angle formed between the end electrode and the alignment direction is larger than or equal to 30° and smaller than or equal to 40°.

20 Claims, 8 Drawing Sheets

ARRAY SUBSTRATE, DISPLAY PANEL AND DISPLAY DEVICE

CROSS-REFERENCE TO RELATED APPLICATION

This application claims priority to Chinese Application No. 201410839622.3, filed Dec. 30, 2014, which is herein incorporated by reference in its entirety.

TECHNICAL FIELD

The present disclosure relates to the field of flat display panel technologies and, in particular, to an array substrate, a display panel and a display device

BACKGROUND

In the field of liquid crystal display technologies, within an In-Plane Switching display panel which is different from a Twisted Nematic (TN) display panel where liquid crystal molecules are arranged vertically, a planar electric field is generated between electrodes of pixels in the same plane so that alignment liquid crystal molecules between the electrodes and those right over the electrodes can be rotated to a direction parallel to the plane of the substrate, thereby improving light transmittance of a liquid crystal layer. Moreover, if the liquid crystal molecules are subjected to an ambient pressure, the liquid crystal molecules slightly sink downward but are almost still maintained in the same plane overall, and hence images displayed by the display panel will not suffer from distortion and color degradation, thereby preventing the effect of the displayed images from being impaired. Due to its advantages such as a fast response speed, a large viewable angle, ripple-free touch, and real color presentation, the In-Plane Switching display panel has been widely applied in various fields.

Figure 1:
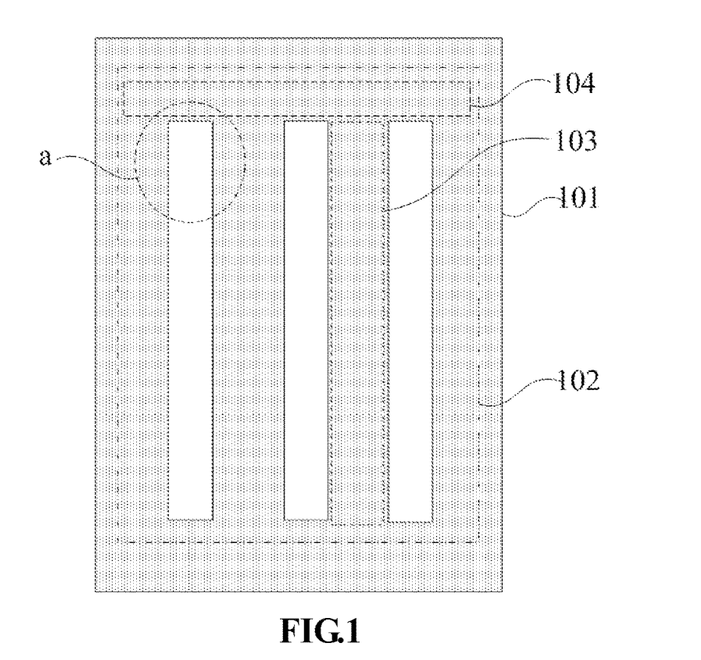
FIG. 1 is a schematic diagram showing the structure of a pixel unit of an In-Plane Switching display panel provided in the related art.

As shown in FIG. 1, a pixel unit of an conventional In-Plane Switching display panel includes a common electrode 101 and a pixel electrode 102 which are disposed over one another, and an insulation layer (not shown) disposed between the common electrode 101 and the pixel electrode 102, where the common electrode 101 has a plurality of strip branch electrodes 103 and an end electrode 104 disposed at ends of the branch electrodes 103. When a voltage is applied across the common electrode 101 and the pixel electrode 102, a planar electric field can be formed between the common electrode 101 and the pixel electrode 102 to control rotation of the liquid crystal molecules.

Figure 2:
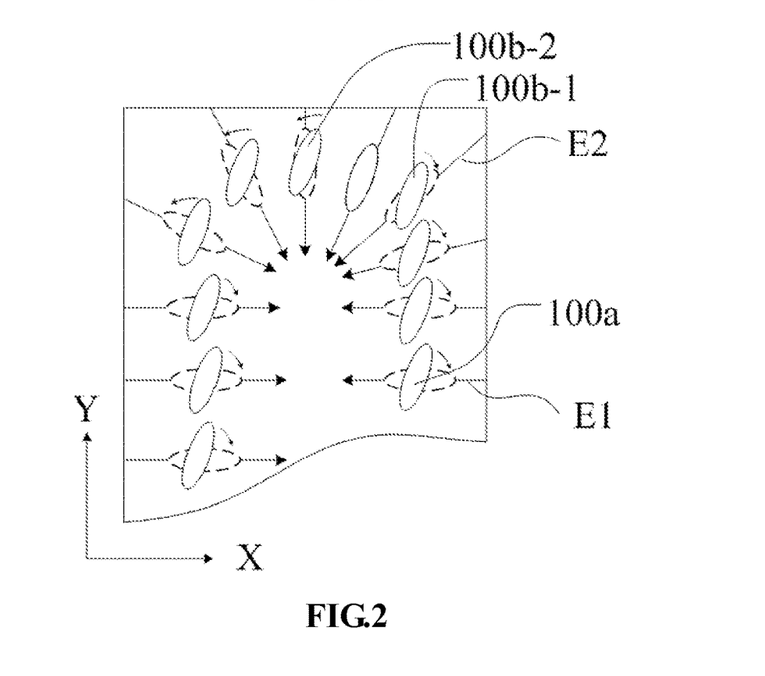
FIG. 2 is a partially enlarged view showing arrangement of liquid crystal molecules of the pixel unit at a position a shown in FIG. 1.

FIG. 2 is a partially enlarged view showing arrangement of liquid crystal molecules of the pixel unit at a position a shown in FIG. 1. With reference to FIG. 2 in combination with FIG. 1, a first electric field E1 with a direction X is formed between the pixel electrode 102 and the branch electrode 103 of the common electrode 101, so that the liquid crystal molecules 100a are rotated, under the effect of the first electric field E1, from the initial alignment directions (i.e. directions of macro-axes of liquid crystal molecules represented by solid lines) to a direction parallel to the direction of the first electric field E1. However, the liquid crystal molecules 100b close to the end electrode 104 of the common electrode will be subjected to the control of second electric fields E2. Also, such second electric fields E2 close to the end electrode 104 have different directions, so that the liquid crystal molecules 100b have different rotation directions when they are rotated from the respective initial alignment directions to directions parallel to the directions of the second electric fields E2 under the effect of the second electric fields E2 having different directions. As shown in FIG. 2, for example, the liquid crystal molecule 100b-1 is rotated to the right, but the liquid crystal molecule 100b-2 is rotated to the left. Furthermore, since the liquid crystal molecules close to the end electrode 104 of the common electrode will also be affected by the first electric field E1 in addition to the second electric fields E2, arrangement of these liquid crystal molecules may be further disordered and hence form black disclination lines at edge positions of the pixel unit. In this case, if an external force is applied to a surface of the display panel and a slide operation is performed on the surface, the arrangement of the liquid crystal molecules is more disordered, resulting in an increase of a black disclination line region at the edge positions of the pixel unit, a decrease of light transmittance of the pixel unit and a reduction of luminance of the pixel unit, leading to nonuniform display and trace Mura in the display panel.

SUMMARY

In view of the above problems, embodiments of the disclosure provide an array substrate, including: a plurality of pixel units; an alignment layer covering the pixel units and having an alignment direction parallel to a plane of the array substrate; and a first electrode and a second electrode both disposed within each of the pixel units; where, the first electrode has at least one branch electrode, the branch electrode has a median electrode and an end electrode disposed at at least one end of the median electrode, an angle formed between the end electrode and the alignment direction is different from that formed between the median electrode and the alignment direction, and the angle formed between the end electrode and the alignment direction is larger than or equal to 30° and smaller than or equal to 40°.

Embodiments of the disclosure further provide a display panel, including the array substrate described above, an opposite substrate disposed opposite to the array substrate, and a liquid crystal layer disposed between the array substrate and the opposite substrate.

Embodiments of the disclosure further provide a display device, including the display panel described above.

The angle formed between the end portion electrode of the pixel unit and the alignment direction is designed to be larger than or equal to 30° and smaller than or equal to 40° in order to reduce the area of black disclination lines region at the edge positions of the pixel unit and improve the light transmittance, and further decrease the intensity of the undesired electric field at the edge positions of the pixel unit, thereby effectively solving the problem of the nonuniform display and trace Mura in the display image.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

In order to more clearly illustrate the technical solutions of the embodiments of the disclosure, the drawings used for the description of the embodiments are briefly introduced below. Obviously, the drawings for the following description only show some embodiments of the disclosure, and other drawings may also be obtained from the described drawings.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The technical solutions in the embodiments of the disclosure are described below in combination with the drawings. Obviously, the described embodiments are some instead of all embodiments of the disclosure. Other embodiments obtained in light of the described embodiments of the disclosure should fall within the protection scope of the present disclosure.

Embodiments of the disclosure provide an array substrate, including a plurality of gate lines and a plurality of data lines, where, a plurality of pixel units are defined by insulatively intersecting the gate lines with the data lines, and a thin film transistor is disposed at an intersection between the gate line and the data line and is further electrically connected with the gate line and the data line. The pixel units can be arranged in an array or arranged in a staggered manner. The pixel units are covered by an alignment layer having an alignment direction parallel to a plane of the array substrate. A first electrode and a second electrode both are disposed within the pixel unit, where, the first electrode and the second electrode can generate a planar electric field to control rotation of the liquid crystal molecules, and the first electrode has at least one branch electrode. The branch electrode includes a median electrode and an end electrode disposed at at least one end of the median electrode. An angle formed between the end electrode and the alignment direction is different from that formed between the median electrode and the alignment direction, where, the angle formed between the end electrode and the alignment direction is larger than or equal to 30°, and smaller than or equal to 40°. The angle formed between the end electrode and the alignment direction refers to an angle between an extension direction of the end electrode parallel to the array substrate and an alignment direction of the alignment layer parallel to the array substrate. The first electrode is a pixel electrode and the second electrode is a common electrode, or the first electrode is a common electrode and the second electrode is a pixel electrode.

In an Fringe Field Switching (FFS) display mode, the first electrode and the second electrode can be located at different layers, i.e. the first electrode and the second electrode are insulatively stacked over one another, and in this case, a fringe electric field is formed between the first electrodes and the second electrodes so that alignment liquid crystal molecules between the electrodes and those right over the electrodes can be rotated to directions parallel to the plane of the substrate, thereby improving light transmittance of a liquid crystal layer. In an In-Plane Switching (IPS) display mode, the first electrode and the second electrode may be located at different layers or at the same layer, where, each of the first electrode and the second electrode includes a plurality of branch electrodes, the branch electrodes of the first electrode are arranged alternately with and spaced from the branch electrodes of the second electrode, and in this way, an electric field parallel to the array substrate is formed between the first electrode and the second electrode to control rotation of the liquid crystal molecules so as to display a image with an better angle of view.

The first electrode is illustratively described as a pixel electrode and the second electrode is illustratively described as a common electrode in the FFS display mode below.

Figure 3:
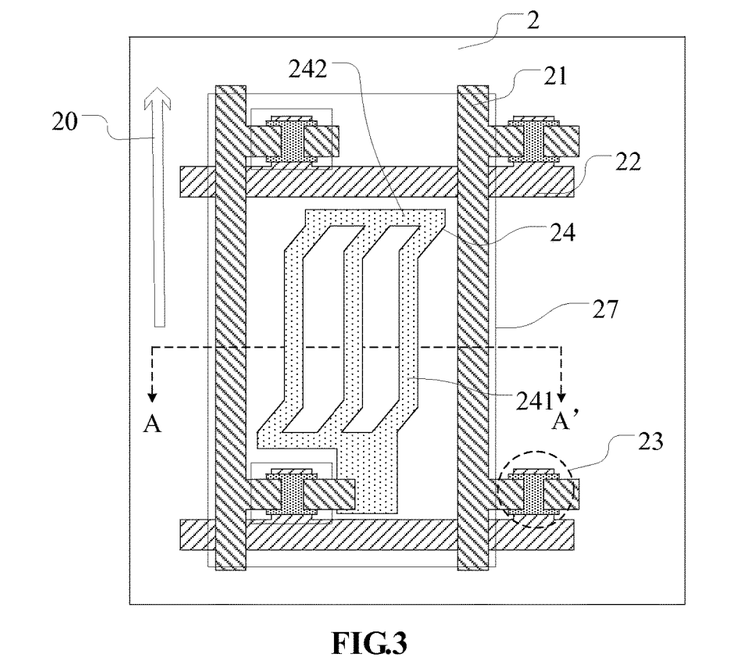
FIG. 3 is a schematic diagram showing the structure of a pixel unit of an array substrate, according to embodiments of the disclosure.
Figure 4:
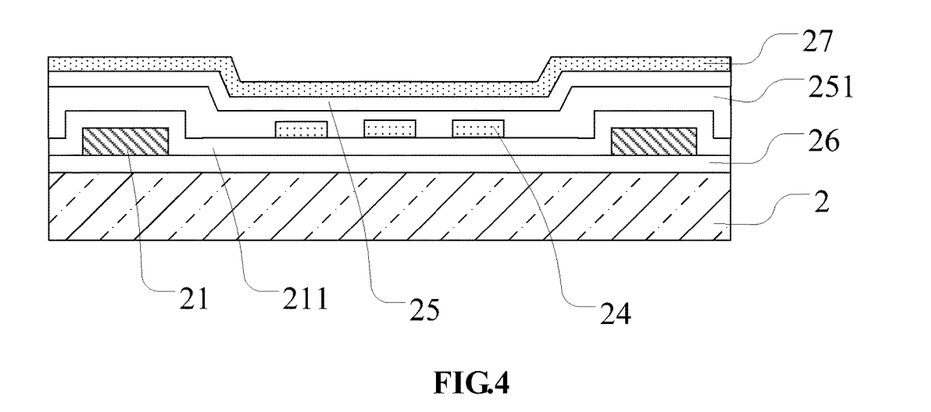
FIG. 4 is a sectional diagram of the array substrate shown in FIG. 3 taken along a section line A-A'.

FIG. 3 is a schematic diagram showing the structure of a pixel unit of an array substrate, according to embodiments of the disclosure, and FIG. 4 is a sectional diagram of the array substrate shown in FIG. 3 taken along a section line A-A'. As shown in FIG. 3, the array substrate 2 includes a plurality of gate lines 22 and a plurality of data lines 21, where, a plurality of pixel units are defined by insulatively intersecting the gate lines 22 with the data lines 21, and a thin film transistor 23 is disposed at an intersection between the gate line 22 and the data lines 21 and is further electrically connected with the gate line 22 and data line 21. The pixel units can be arranged in an array or arranged in a staggered manner. In embodiments, illustratively, one of the pixel units will be described to explain the structure thereof.

With reference to FIG. 4, the array substrate includes an underneath substrate 2, where, the underneath substrate 2 may be a glass substrate or a flexible resin substrate. A gate insulation layer 26 covering the gate lines 22 is disposed on the underneath substrate 2, the data lines 21 are disposed on the gate insulation layer 26, an insulation layer 211 is disposed to cover the data lines 21 and the gate insulation layer 26, and a pixel electrode 24 is disposed on the insulation layer 211 and electrically connected with a drain electrode of the thin film transistor 23 via a via hole (not shown) in the insulation layer 211. The pixel electrode 24 includes at least one branch electrode 241. In embodiments, the pixel electrode 24 includes three branch electrodes 241, and end portions of the plurality of branch electrodes 241 are connected with a connection electrode 242 so that a data signal can be transmitted to each of the branch electrodes 241. An interlamination insulation layer 251 is disposed to cover the pixel electrode 24 and the insulation layer 211, an entire common electrode 25 is disposed on the interlamination insulation layer 251, and a fringe electric field can be formed between the common electrode 25 and the pixel electrode 24. The common electrodes 25 of the plurality of pixel units can be electrically connected together with each other and connected to a peripheral circuit via wirings in order to receive a common electrode signal. An alignment layer 27 is disposed on the common electrode 25 and covers the pixel unit, and has an alignment direction 20 parallel to the plane of the array substrate. In the case of liquid crystal molecules having a negative dielectric anisotropy, the alignment direction is substantially perpendicular to an extension direction of the branch electrode. In FIGS. 3 and 4, illustratively, liquid crystal molecules having a positive dielectric anisotropy are employed, and the alignment direction 20 is substantially parallel to the extension direction of the branch electrode 241.

Figure 5:
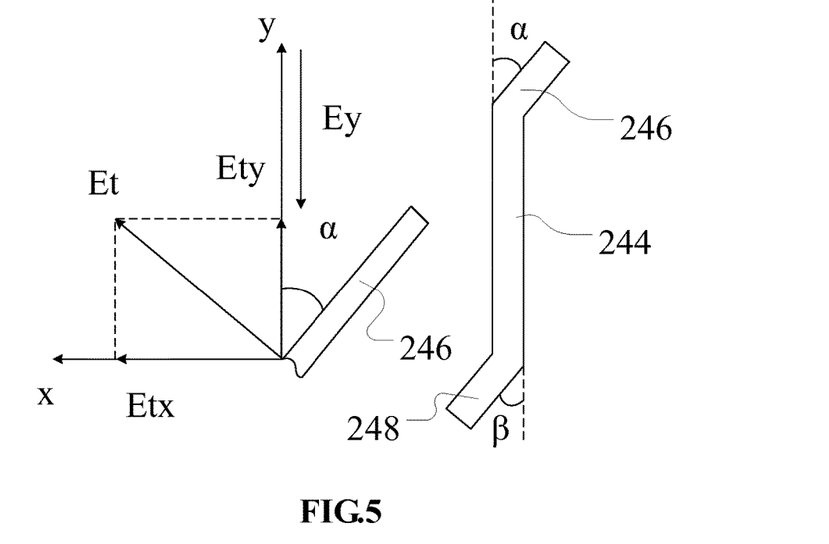
FIG. 5 is a schematic diagram showing directions of electric fields generated at the pixel electrode, according to embodiments of the disclosure.

FIG. 5 is a schematic diagram showing directions of electric fields generated at the pixel electrode, according to embodiments of the disclosure. With reference to FIG. 5, the branch electrode 241 of the pixel electrode 24 includes a median electrode 244, a first end electrode 246 disposed at an end of the median electrode 244 and a second end electrode 248 disposed at the other end of the median electrode 244. The first end electrode 246 is inclined towards a direction perpendicular to the median electrode 244 and the second end electrode 248 is inclined towards a direction opposite to the direction perpendicular to the median electrode 244, forming a Z-shaped structure. That is, the first end electrode 246 is bent towards one side of the median electrode 244 and the second end electrode 248 is bent towards the other side of the median electrode 244. An angle α formed between the first end electrode 246 and the alignment direction 20 and an angle β formed between the second end electrode 248 and the alignment direction 20 are different from that formed between the median electrode 244 and the alignment direction 20. In embodiments, the median electrode 244 has a straight-shaped structure, and an angle formed between the median electrode 244 and the alignment direction 20 is 0°.

Initially, the liquid crystal molecules are oriented in a direction that is the same as the alignment direction 20. During normal operations of the array substrate, a first electric field force Et perpendicular to the first end electrode 246 is generated at the end of the branch electrode 241 of the pixel electrode, to control rotation of the liquid crystal molecules to the direction of the first electric field force Et. However, because a connection electrode 242 is further disposed at the end of the branch electrode 241 of the pixel electrode, a second electric field force Ey towards the inside of the pixel unit is further generated. The larger the second electric field force Ey is, the larger the number of the liquid crystal molecules constrained in the same direction as the alignment direction, resulting in an increase of a black disclination line region at the edge positions of the pixel unit, thereby affecting the light transmittance of the entire image. Assuming that an intensity component of the first electric field force Et in a direction (i.e. a direction y) parallel to the alignment direction 20 is defined as Ety, and an intensity component of the first electric force Et in a direction (i.e. a direction x) perpendicular to the alignment direction 20 is defined as Etx, the direction of the intensity component Ety is opposite to the direction of the second electric field force Ey, and Ety=Et*Sin α. Since the direction of the intensity component Ety of the second electric field force Et is opposite to the direction of the second electric field force Ey, the control over the liquid crystal molecules by the undesired second electric field force Ey may be offset by the intensity component Ety, so that the intensity of the electric field constraining the liquid crystal molecules may be represented by Ey-Ety. As such, the intensity component Ety is increased gradually as increasing the angle α formed between the first end electrode 246 and the alignment direction, and the intensity (Ey-Ety) of the undesired electric field is in turn decreased gradually, thereby preventing a black disclination line region at the edge positions of the pixel unit from expending towards the inside of the pixel unit, and alleviating the problem of the nonuniform display and trace Mura in the display image.

Figure 6:
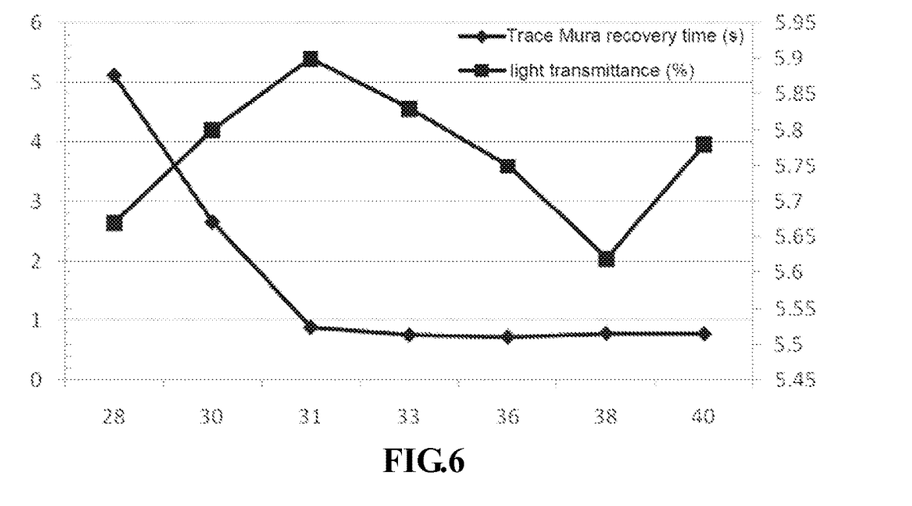
FIG. 6 is a graph showing trace Mura recovery time and light transmittance of the display panel versus the angle between the end electrode and the alignment direction, according to embodiments of the disclosure.

FIG. 6 is a graph showing trace Mura recovery time and light transmittance of the display panel versus the angle α between the end electrode and the alignment direction, according to embodiments of the disclosure. Values of the trace Mura recovery time and light transmittance varying with the angle α are listed in detail in Table 1:

TABLE 1

| Angle α | Trace Mura recovery time (s) | light transmittance (%) |
|---------|------------------------------|-------------------------|
| 28°     | 5.12                         | 5.67%                   |
| 30°     | 2.65                         | 5.80%                   |
| 31°     | 0.88                         | 5.90%                   |
| 33°     | 0.75                         | 5.83%                   |
| 36°     | 0.72                         | 5.75%                   |
| 38°     | 0.78                         | 5.62%                   |
| 40°     | 0.77                         | 5.78%                   |

It is indicated by the above experiment data that the trace Mura recovery time of the display panel is decreased gradually as the angle α formed between the first end electrode 246 and the alignment direction 20 is increased gradually. When the angle α formed between the first end electrode 246 and the alignment direction 20 is 28°, the trace Mura recovery time of the display panel reaches up to 5 second (s), and the trace Mura can be significantly noticeable. However, when the angle α formed between the first end electrode 246 and the alignment direction 20 is increased gradually to be in the range of 30° to 40°, the trace Mura recovery time of the display panel is decreased to be below 2.65 s, thereby significantly improving the nonuniform display and trace Mura of the display panel. Referring still to FIG. 6, when the angle α formed between the first end electrode 246 and the alignment direction 20 is increased gradually to be in the range of 31° to 40°, the trace Mura recovery time of the display panel is decreased to be below 1 s, and in this case, after the external force is applied to the display panel and a slide operation is performed on the surface, the display panel can quickly recover to display an image normally, thereby effectively solving the problem of the nonuniform display and trace Mura, furthermore, the trace Mura recovery time is relatively stable and will not vary dramatically with the variation of the angel of α, thus the angel of α larger than or equal to 31° and smaller than or equal to 40° is suitable for the mass production process.

It is noted that, since the angle α formed between the first end electrode 246 and the alignment direction 20 can further affect the light transmittance of the display panel, the angle α cannot be excessively large. It can be known from Table 1 and FIG. 6 that the light transmittance of the display panel is smaller than 5.8% when the angle α is smaller than 30° or larger than 33°, thus significantly affecting luminance of the image displayed by the display panel. Therefore, the angle α formed between the first end electrode 246 and the alignment direction 20 can be designed to be larger than or equal to 30° and smaller than or equal to 33° considering the light transmittance of the display panel under the precondition of alleviating the trace Mura. As such, the nonuniform display and the trace Mura in the display panel can be effectively alleviated while the better light transmittance can be obtained. Further, the angle α formed between the first end electrode 246 and the alignment direction 20 can be designed to be 31°, the display panel can obtain the largest light transmittance of 5.9%. With such angle α, the trace Mura recovery time of the display panel is decreased to be below 1 s without sacrificing the display quality of the display panel, thereby significantly improving the nonuniform display and trace Mura of the display panel.

Back to FIG. 5, similarly the angle β formed between the second end electrode 248 and the alignment direction 20 can be designed to be larger than or equal to 30° and smaller than or equal to 40°, and further, can be designed to be larger than or equal to 30° and smaller than or equal to 33°, and still further, can be designed to be 31°. The reason is the same as that of design of the angle α formed between the first end electrode 246 and the alignment direction 20, which is not repeated again. The angle formed between the end electrode of the pixel unit and the alignment direction is designed to be larger than or equal to 30° and smaller than 40° in order to reduce the area of black disclination lines region at the edge positions of the pixel unit and improve the light transmittance, and further decrease the intensity of the undesired electric field at the edge positions of the pixel unit, thereby effectively solving the problem of the nonuniform display and trace Mura in the display image.

Figure 7:
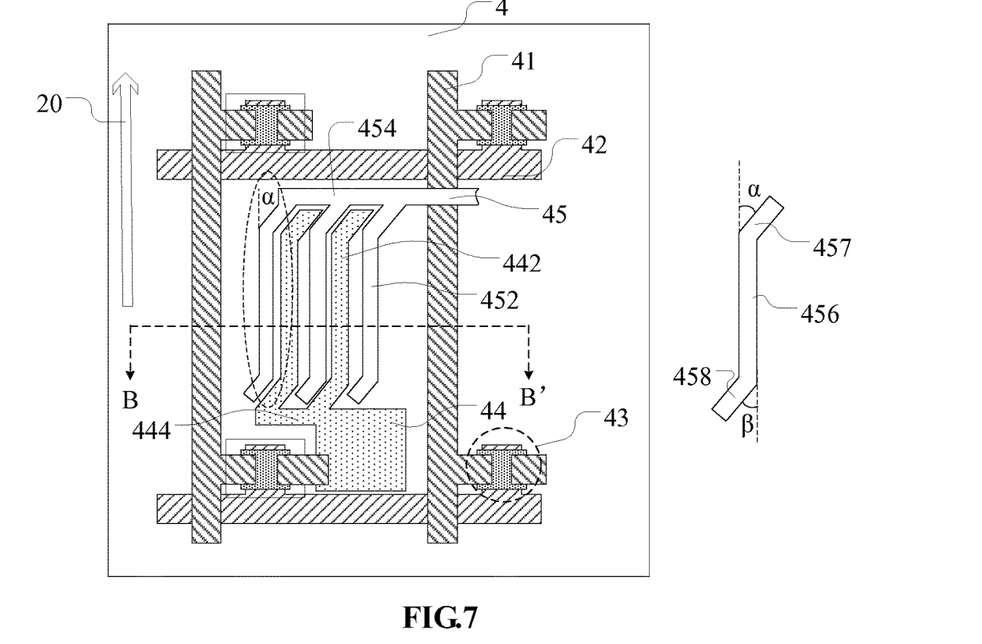
FIG. 7 is a schematic diagram of the structure of a pixel unit of another array substrate, according to embodiments of the disclosure.
Figure 8:
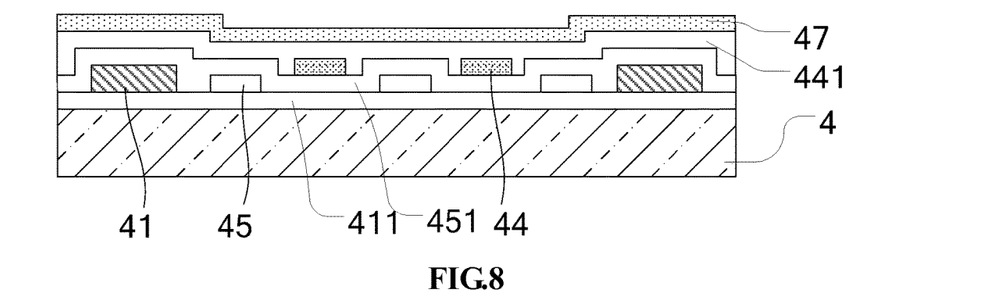
FIG. 8 is a sectional diagram of the array substrate shown in FIG. 7 taken along a sectional line B-B'.

FIG. 7 is a schematic diagram of the structure of a pixel unit of another array substrate, according to embodiments of the disclosure, and FIG. 8 is a sectional diagram of the array substrate shown in FIG. 7 taken along a sectional line B-B'. The first electrode is illustratively described as a pixel electrode and the second electrode is illustratively described as a common electrode in the IPS display mode below. With reference to FIGS. 7 and 8, the array substrate includes an underneath substrate 4. A gate insulation layer 411 covering the gate lines 22 is disposed on the underneath substrate 4, and the data lines 21 and the common electrode 45 are disposed on the gate insulation layer 411. The common electrode 45 includes at least one branch electrode 452. In embodiments, the common electrode 45 includes three branch electrodes 452, and end portions of the branch electrodes 452 have connection electrodes 454 connected with the plurality of branch electrodes 452. The common electrodes of the plurality of pixel units can be electrically connected together with each other and connected to a peripheral circuit via wirings in order to receive a common electrode signal. An interlamination insulation layer 451 is disposed to cover data lines 41, the common electrode 45 and the gate insulation layer 411, where, an pixel electrode 44 is disposed on the interlamination insulation layer 451 and electrically connected with a drain electrode of a thin film transistor 43 via a via hole in an insulation layer 451. The pixel electrode 44 includes at least one branch electrode 442. In embodiments, the pixel electrode 44 includes two branch electrodes 442, and one end of the branch electrode 442 of the pixel electrode has connection electrodes 444 connected with the plurality of branch electrodes 442 so that a data signal can be outputted to each of the branch electrodes 442 of the pixel electrode. The projections of the branch electrodes 452 of the common electrode 45 on the underneath substrate are arranged alternately with and spaced from the projections of the branch electrodes 442 of the pixel electrode 44 on the underneath substrate, so that horizontal electric fields may be formed between the branch electrodes 452 of the common electrode 45 and the branch electrodes 442 of the pixel electrode 44. A layer 441 and an alignment layer 47 are disposed on the common electrode 45 and covers the pixel unit, and has an alignment direction 20 parallel to a plane of the array substrate. In the case of liquid crystal molecules having a negative dielectric anisotropy, the alignment direction is substantially perpendicular to an extension direction of the branch electrode. In FIGS. 7 and 8, illustratively, liquid crystal molecules having a positive dielectric anisotropy are employed, and the alignment direction 20 is substantially parallel to the extension direction of the branch electrode 442.

In embodiments, the common electrode 45 and the pixel electrode 44 both include a median electrode 456, a first end electrode 457 disposed at an end of the median electrode 456 and a second end electrode 458 disposed at the other end of the median electrode 456. The first end electrode 457 is inclined towards a direction perpendicular to the median electrode 456 and the second end electrode 458 is inclined toward a direction opposite to the direction perpendicular to the median electrode 456, i.e. the first end electrode 457 is bent towards one side of the median electrode 456, and the second end electrode 458 is bent towards the other side of the median electrode 456. An angle α formed between the first end electrode 457 and the alignment direction 20 and an angle β formed between the second end electrode 458 and the alignment direction 20 are different from that formed between the median electrode 456 and alignment direction 20. In embodiments, the median electrode 456 has a straight-shaped structure, and an angle formed between the median electrode 456 and the alignment direction 20 is 0°.

Similar to the electric field force of the pixel electrode shown in FIG. 5, initially, liquid crystal molecules are oriented in a direction that is the same as the alignment direction 20. During normal operations of the array substrate, a first electric field force Et perpendicular to the first end electrode 457 can be generated at the end of the branch electrodes of both the common electrode and the pixel electrode, to control rotation of the liquid crystal molecules to the direction of the first electric field force Et. However, because a connection electrode is further disposed at the end of the branch electrodes of both the common electrode and the pixel electrode, a second electric field force Ey toward the inside of the pixel unit is further generated. The larger the second electric field force Ey is, the larger the number of the liquid crystal molecules constrained to be in the same direction as the alignment direction, resulting in an increase of a black disclination line region at the edge positions of the pixel unit, thereby affecting the light transmittance of the entire image. Assuming that an intensity component of the first electric field force Et in a direction (i.e. a direction y) parallel to the alignment direction 20 is defined as Ety, and an intensity component of the first electric force Et in a direction (i.e. a direction x) perpendicular to the alignment direction 20 is defined as Etx. The direction of the intensity component Ety is opposite to the direction of the second electric field force Ey, and Ety=Et*Sin α. Since the direction of the intensity component Ety of the second electric field force Et is opposite to the direction of the second electric field force Ey, the control over the liquid crystal molecules by the undesired second electric field force Ey may be offset by the intensity component Ety, so that the intensity of the electric field constraining the liquid crystal molecules may be represented by Ey-Ety. As such, the intensity component Ety is increased gradually as increasing the angle α formed between the first end electrode 457 and the alignment direction, and the intensity (Ey-Ety) of the undesired electric field is in turn decreased gradually, thereby preventing a black disclination line region at the edge positions of the pixel unit from expending towards the inside of the pixel unit, and alleviating the problem of the nonuniform display and trace Mura in the display image.

If the angle α formed between the first end electrode 467 and the alignment direction 20 and the angle β formed between the second end electrode 468 and the alignment direction 20 both are designed to be larger than or equal to 30° and smaller than or equal to 40°, the intensity component Ety is enough to offset the intensity of the undesired electric field and reduce the area of black disclination lines region at the edge positions of the pixel unit, thereby solving the problem of the nonuniform display and trace Mura in the display panel. Further, if the angle α formed between the first end electrode 467 and the alignment direction 20 and the angle β formed between the second end electrode 468 and the alignment direction 20 both are designed to be larger than or equal to 30° and smaller than or equal to 33°, the nonuniform display and the trace Mura in the display panel can be effectively alleviated while obtaining the better light transmittance. Further, if the angle α formed between the first end electrode 467 and the alignment direction 20 and the angle β formed between the second end electrode 468 and the alignment direction 20 both are designed to be 31°, the display panel can obtain the largest light transmittance. Meanwhile, the trace Mura recovery time of the display panel is decreased to be below 1 s without sacrificing the display quality of the display panel, thereby significantly improving the nonuniform display and trace Mura of the display panel.

In other embodiments, the pixel electrode 44 and the common electrode 45 can further be located at the same layer, and in this case, the branch electrodes of the pixel electrode are arranged alternately with and spaced from the branch electrodes of the common electrode.

Figure 9:
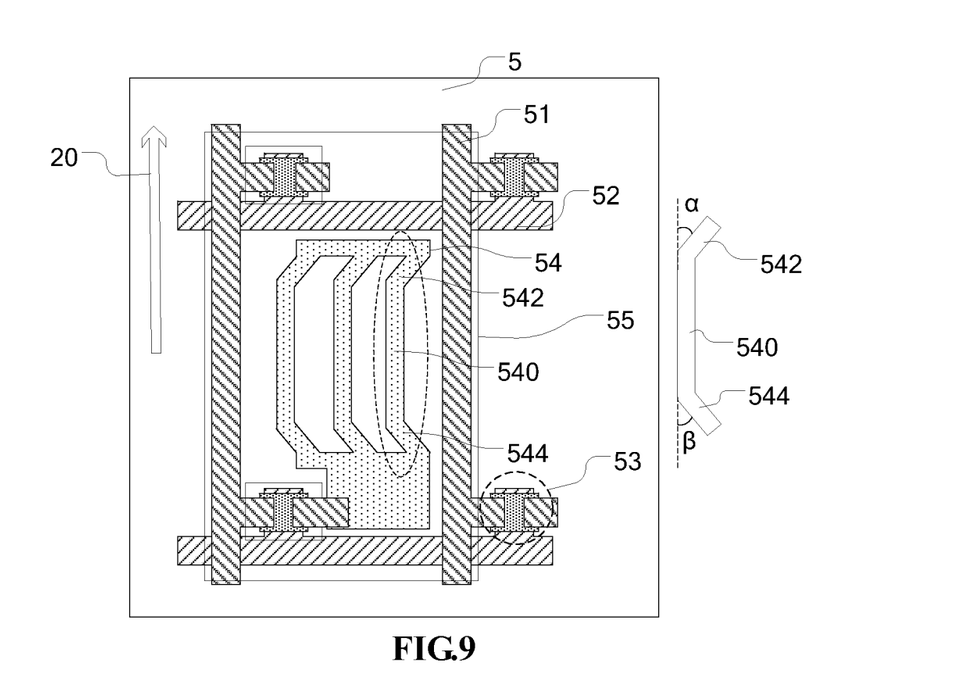
FIG. 9 is a schematic diagram showing the structure of a pixel unit of another array substrate, according to embodiments of the disclosure.

FIG. 9 is a schematic diagram showing the structure of a pixel unit of another array substrate, according to embodiments of the disclosure. As shown in FIG. 9, a difference between the structure of the pixel unit of FIG. 9 and that of the pixel unit shown in FIG. 3 lies in that, the branch electrode of the pixel electrode 54 includes a median electrode 540, a first end electrode 542 disposed at one end of the median electrode 540 and a second end electrode 544 disposed at the other end of the median electrode 540; and the first end electrode 542 and the second end electrode 544 are inclined inversely with respect to a direction perpendicular to the median electrode 244. That is, the first end electrode 542 is bent towards one side of the median electrode 540 and the second end electrode 544 is bent towards the same side of the median electrode 540. An angle α formed between the first end electrode 542 and the alignment direction 20 and an angle β formed between the second end electrode 544 and the alignment direction 20 are different from an angle formed between the median electrode 540 and alignment direction 20. In embodiments, the median electrode 540 has a straight-shaped structure, and an angle formed between the median electrode 540 and the alignment direction 20 is 0°.

Basic structure of the pixel unit of FIG. 9 is the same as that of the pixel unit shown in FIG. 3, which is not repeated here. The pixel unit of FIG. 9 is implemented in the FFS display mode, and may alternatively be implemented in the IPS display mode.

If the angle α formed between the first end electrode 542 and the alignment direction 20 and the angle β formed between the second end electrode 544 and the alignment direction 20 both are designed to be larger than or equal to 30° and smaller than or equal to 40°, the intensity component Ety is enough to offset the intensity of the undesired electric field and reduce the area of black disclination lines region at the edge positions of the pixel unit, thereby solving the problem of the nonuniform display and trace Mura in the display panel. Further, if the angle α formed between the first end electrode 542 and the alignment direction 20 and the angle β formed between the second end electrode 544 and the alignment direction 20 both are designed to be larger than or equal to 30° and smaller than or equal to 33°, the nonuniform display and the trace Mura in the display panel can be effectively alleviated while obtaining the better light transmittance. Further, if the angle α formed between the first end electrode 542 and the alignment direction 20 and the angle β formed between the second end electrode 544 and the alignment direction 20 both are designed to be 31°, the display panel can obtain the largest light transmittance. Meanwhile, the trace Mura recovery time of the display panel is decreased to be below 1 s without sacrificing the display quality of the display panel, thereby significantly improving the nonuniform display and trace Mura of the display panel. The principle is consistent with that described in reference to FIG. 3, which is not repeated here.

Figure 10:
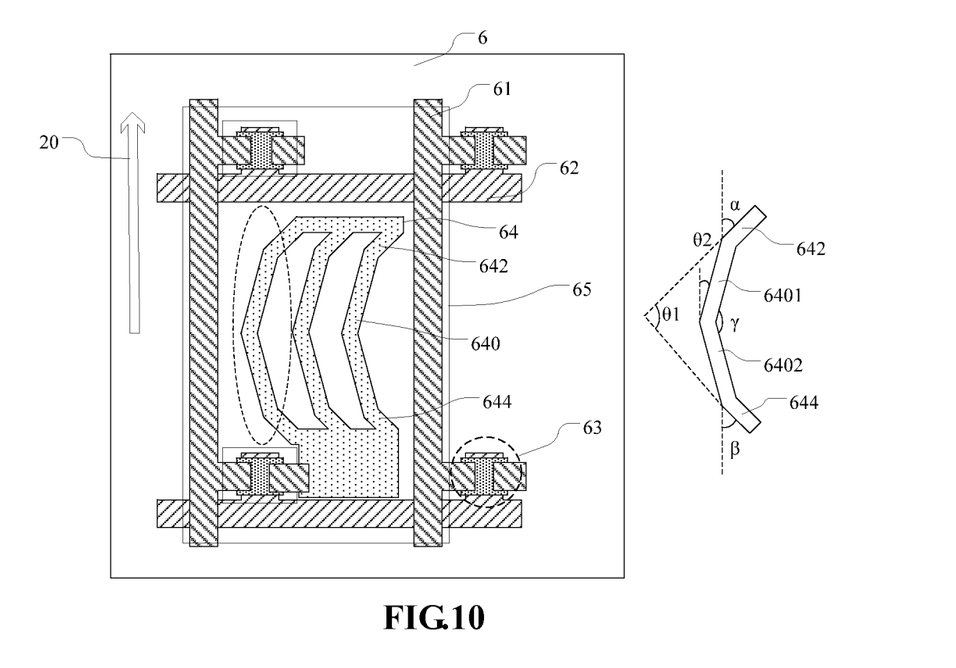
FIG. 10 is a schematic diagram showing the structure of a pixel unit of another array substrate, according to embodiments of the disclosure.

FIG. 10 is a schematic diagram showing the structure of a pixel unit of another array substrate, according to embodiments of the disclosure. As shown in FIG. 10, a difference between the structure of the pixel unit of FIG. 10 and that of the pixel unit shown in FIG. 3 lies in that, the branch electrode of the pixel electrode 64 includes a median electrode 640 having a V-shaped structure which includes a first sub-median electrode 6401 and a second sub-median electrode 6402 connected with each other; an angle γ is formed between the first sub-median electrode 6401 and the second sub-median electrode 6402; and the branch electrode of the pixel electrode 64 further includes a first end electrode 642 disposed at one end of the median electrode 640 and a second end electrode 644 disposed at the other end of the median electrode 640, where, an angle θ1 is formed between an extension direction of the first end electrode 642 and an extension direction of the second end electrode 644. The angle θ1 is smaller than the angle γ of the median electrode 640. An angle α formed between the first end electrode 642 and the alignment direction 20 and an angle β formed between the second end electrode 644 and the alignment direction 20 are different from the angle θ2 formed between the median electrode 644 and the alignment direction 20. In embodiments, α≠θ2 and α>θ2 (and/or β≠θ2 and β>θ2).

The basic structure of the pixel unit of FIG. 10 is the same as that of the pixel unit shown in FIG. 3, which is not repeated here. The pixel unit of FIG. 10 is implemented in the FFS display mode, and may also be implemented in the IPS display mode.

If the angle α formed between the first end electrode 642 and the alignment direction 20 and the angle β formed between the second end electrode 644 and the alignment direction 20 both are designed to be larger than or equal to 30° and smaller than or equal to 40°, the intensity component Ety is enough to offset the intensity of the undesired electric field and reduce the area of black disclination lines region at the edge positions of the pixel unit, thereby solving the problem of the nonuniform display and trace Mura in the display panel. Further, if the angle α formed between the first end electrode 642 and the alignment direction 20 and the angle β formed between the second end electrode 644 and the alignment direction 20 both are designed to be larger than or equal to 30° and smaller than or equal to 33°, the nonuniform display and the trace Mura in the display panel can be effectively alleviated while obtaining the better light transmittance. Further, if the angle α formed between the first end electrode 642 and the alignment direction 20 and the angle β formed between the second end electrode 644 and the alignment direction 20 both are designed to be 31°, the display panel can obtain the largest light transmittance. Meanwhile, the trace Mura recovery time of the display panel is decreased to be below 1 s without sacrificing the display quality of the display panel, thereby significantly improving the nonuniform display and trace Mura of the display panel. The reason is consistent with that described in reference to FIG. 3, which is not repeated here.

Figure 11:
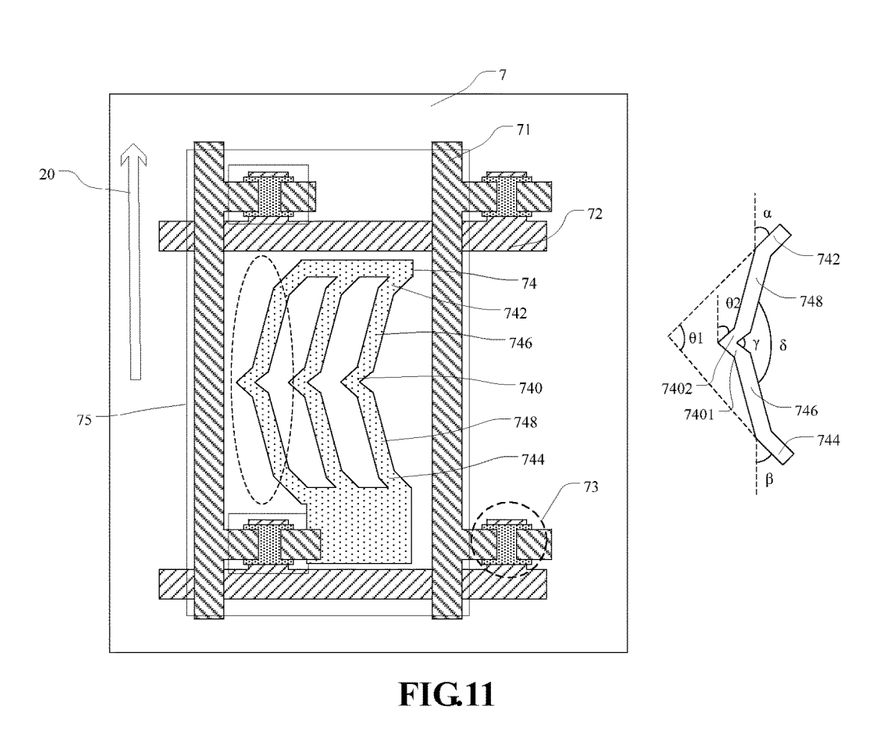
FIG. 11 is a schematic diagram showing the structure of a pixel unit of another array substrate, according to embodiments of the disclosure.

FIG. 11 is a schematic diagram showing the structure of a pixel unit of another array substrate, according to embodiments of the disclosure. As shown in FIG. 11, a difference between the structure of the pixel unit of FIG. 11 and that of the pixel unit shown in FIG. 3 lies in that, the branch electrode of the pixel electrode 74 includes a median electrode 740 having a V-shaped structure which includes a first sub-median electrode 7401 and a second sub-median electrode 7402 connected with each other; an angle γ is formed between the first sub-median electrode 7401 and the second sub-median electrode 7402; and the branch electrode of the pixel electrode 74 further includes a first deflected portion 746 disposed at an end of the median electrode 740 and a second deflected portion 748 disposed at the other end of the median electrode 740, where, an angle δ is formed between an extension direction of the first deflected portion 746 and an extension direction of the second deflected portion 748. The angle δ is larger than the angle γ of the median electrode. A first end electrode 742 is disposed at an end of the first deflected portion 746 away from the median electrode 740, and a second end electrode 744 is disposed an end of second deflected portion 748 away from the median electrode 740, and an angle θ1 is formed between an extension direction of the first end electrode 742 and an extension direction of the second extension direction 744, where, the angle θ1 is larger than the angle γ of the median electrode 740 but is smaller than the angle δ formed between an extension direction of the first deflected portion 746 and an extension direction of the second deflected portion 748. An angle α formed between the first end electrode 742 and the alignment direction 20 and an angle β formed between the second end electrode 744 and the alignment direction 20 are different from the angle θ2 formed between the median electrode 740 and the alignment direction 20, i.e. α≠θ2 (and/or β/θ2).

The basic structure of the pixel unit of FIG. 11 is the same as that of the pixel unit shown in FIG. 3, which is not repeated here. The pixel unit of FIG. 11 is implemented in the FFS display mode, and may also be implemented in the IPS display mode.

If the angle α formed between the first end electrode 742 and the alignment direction 20 and the angle β formed between the second end electrode 744 and the alignment direction 20 both are designed to be larger than or equal to 30° and smaller than or equal to 40°, the intensity component Ety is enough to offset the intensity of the undesired electric field and reduce the area of black disclination lines region at the edge positions of the pixel unit, thereby solving the problem of the nonuniform display and trace Mura in the display panel. Further, if the angle α formed between the first end electrode 742 and the alignment direction 20 and the angle β formed between the second end electrode 744 and the alignment direction 20 both are designed to be larger than or equal to 30° and smaller than or equal to 33°, the nonuniform display and the trace Mura in the display panel can be effectively alleviated while obtaining the better light transmittance. If the angle α formed between the first end electrode 742 and the alignment direction 20 and the angle β formed between the second end electrode 744 and the alignment direction 20 both are designed to be 31°, the display panel can obtain the largest light transmittance. The trace Mura recovery time of the display panel is decreased to be below 1 s without sacrificing the display quality of the display panel, thereby significantly improving the nonuniform display and trace Mura of the display panel. The reason is consistent with that described in reference to FIG. 3, which is not repeated here.

Figure 12:
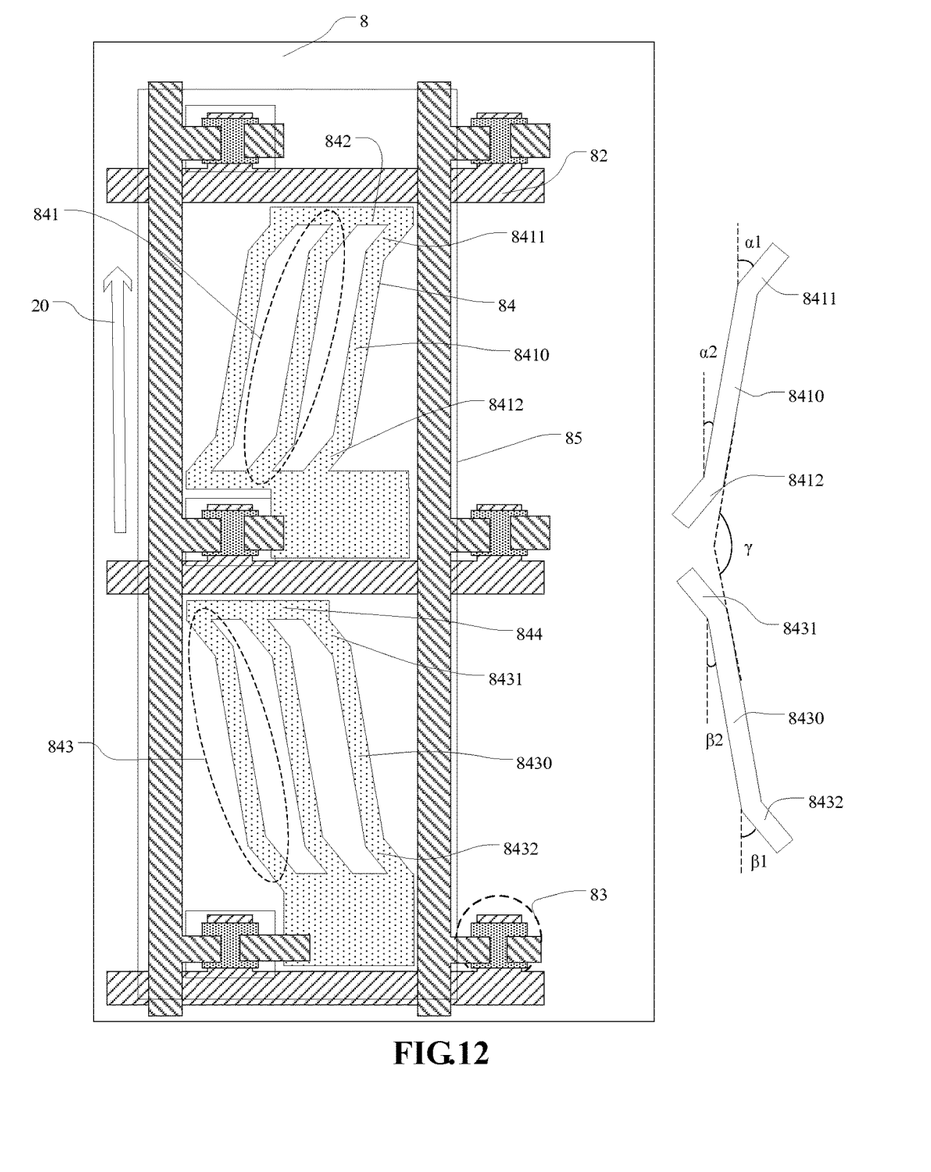
FIG. 12 is a schematic diagram showing the structure of a pixel unit of another array substrate, according to embodiments of the disclosure.

FIG. 12 is a schematic diagram showing the structure of a pixel unit of another array substrate, according to embodiments of the disclosure. As shown in FIG. 12, the array substrate includes a plurality of pixel units arranged in an array. The array substrate 8 includes a plurality of gate lines 81 and a plurality of data lines 82, where, a plurality of pixel units are defined by insulatively intersecting the gate lines 81 with the data lines 82, and a thin film transistor 83 is disposed at an intersection between the gate line 81 and the data line 82 and is further electrically connected with the gate 81 and the data line 82. Embodiments are described with an example of two adjacent rows of pixel units to describe structure thereof.

Pixel units from two adjacent rows each include a pixel electrode 84 and a common electrode 85 insulatively disposed over one another, and a fringe electric field can be formed between the pixel electrode 84 and the common electrode 85 to control rotation of the liquid crystal molecules. The common electrode has an entire planar structure within the pixel unit, and the common electrodes 85 of a plurality of the pixel units can be electrically connected together and further connected to a peripheral circuit via wirings in order to receive a common electrode signal. A pixel electrode 84 of a pixel unit at a row of pixel units includes at least one first branch electrode 841, and a first connection electrode 842 connected with a plurality of the first branch electrodes 841 is disposed at the ends of the first branch electrodes 841. Meanwhile, a pixel electrode 84 of a pixel unit at another row adjacent to the above-described row of pixel units includes at least one second branch 843, and a first connection electrode 844 connected with a plurality of the second branch electrodes 843 disposed at the ends of the second branch electrodes 843. Therefore, a data signal can be transmitted to each of the first branch electrodes 841 and each of the second branch electrodes 843. In the present embodiment, each of the pixel units has three first branch electrodes 841 or three second branch electrode 843. An alignment layer (not shown) is disposed on the common electrode 85 and covers the pixel unit, and has an alignment direction 20 parallel to the plane of the array substrate. In the case of liquid crystal molecules having a negative dielectric anisotropy, the alignment direction is substantially perpendicular to an extension direction of the branch electrode. In FIG. 12, illustratively, liquid crystal molecules having a positive dielectric anisotropy are employed, and the alignment direction 20 is substantially parallel to the extension direction of the branch electrode of the pixel unit.

Referring still to FIG. 12, the first branch electrode 841 of the pixel electrode in a pixel unit from a row of pixel units includes a first median electrode 8410, a first end electrode 8411 disposed at one end of the first median electrode 8410 and a second end electrode 8412 disposed at the other end of the first median electrode 8410. The first end electrode 8411 is inclined towards a direction perpendicular to the first median electrode 8410 and the second end electrode 8412 is inclined towards a direction opposite to the direction perpendicular to the first median electrode 8410, forming a Z-shaped structure. That is, the first end electrode 8411 is bent towards one side of the first median electrode 8410, and the second end electrode 8412 is bent towards the other side of the first median electrode 8410. An angle $\alpha 1$ formed between the first end electrode 8411 and the alignment direction 20 and an angle formed between the second end electrode 8412 and the alignment direction 20 are different from an angle $\alpha 2$ formed between the first median electrode 8410 and alignment direction 20. In embodiments, $\alpha 1 \neq \alpha 2$ and $\alpha 1 > \alpha 2$. The second branch electrode 843 of the pixel electrode in a pixel unit from another adjacent row of pixel units includes a second median electrode 8430, a third end electrode 8431 disposed at an end of the second median electrode 8430 and a fourth end electrode 8432 disposed at the other end of the second median electrode 8430. The third end electrode 8431 is inclined towards a direction perpendicular to the second median electrode 8430 and the fourth end electrode 8432 is inclined towards a direction opposite to the direction perpendicular to the second median electrode 8430, forming a Z-shaped structure. That is, the third end electrode 8431 is bent towards one side of the second median electrode 8430, and the fourth end electrode 8432 is inclined towards the other side of the second median electrode 8430. An angle $\beta 1$ formed between the third end electrode 8431 and the alignment direction 20 and an angle formed between the fourth end electrode 8432 and the alignment direction 20 are different from an angle $\beta 2$ formed between the second median electrode 8430 and alignment direction 20. In embodiments, $\beta 1 \neq \beta 2$ and $\beta 1 > \beta 2$.

In embodiments, the first median electrode 8410 and the second median electrode 8430 both have a straight structure, and the first median electrode 8410 and the second median electrode 8430 respectively from two pixel units at two adjacent rows of pixel units are inclined inversely with respect to a direction perpendicular to the alignment direction. An angle $\gamma$ is formed between an extension direction of the first median electrode 8410 and an extension direction of the second median electrode 8430, and $90° < \gamma < 180°$. That is, the first median electrode 8410 from a pixel unit at one of two adjacent rows of pixel units, and the second median electrode 8430 from a pixel unit at the other of the two adjacent rows of pixel units are inclined with respect to the same direction perpendicular to the alignment direction. In other words, a dual-domain structure is formed by two pixel units at two adjacent rows of pixel units, rather than forming a dual-domain structure within a single pixel unit. With the structure of the pixel unit provided in the present embodiment, not only a wide angle of view of the display panel is achieved but also the median black disclination line region within the pixel unit is eliminated, thereby improving the light transmittance of the entire display. Further, the structure of the pixel electrode and the common electrode within the pixel unit can be simplified, and the array substrate can be designed to have a larger resolution as actually desired.

Similar to the electric field force of the pixel electrode shown in FIG. 5, initially, the liquid crystal molecules are oriented in the same direction as the alignment direction 20. During normal operations of the array substrate, a first electric field force Et perpendicular to the first end electrode 8411 can be generated at the end of the branch electrode 841 of the pixel electrode, to control rotation of the liquid crystal molecules to the direction of the first electric field force Et. However, because a connection electrode 842 is further disposed at the end of the first branch electrode 841 of the pixel electrode, a second electric field force Ey toward the inside of the pixel unit is further generated. The larger the second electric field force Ey is, the larger the number of the liquid crystal molecules constrained to be in the same direction as the alignment direction, resulting in an increase of a black disclination line region at the edge positions of the pixel unit, thereby affecting the light transmittance of the entire image. Assuming that an intensity component of the first electric field force Et in a direction (i.e. a direction y) parallel to the alignment direction 20 is defined as Ety, and an intensity component of the first electric force Et in a direction (i.e. a direction x) perpendicular to the alignment direction 20 is defined as Etx. The direction of the intensity component Ety is opposite to the direction of the second electric field force Ey, and Ety=Et*Sin $\alpha$. Since the direction of the intensity component Ety is opposite to the direction of the second electric field force Ey, the control over the liquid crystal molecules by the undesired second electric field force Ey may be offset by the intensity component Ety, so that the intensity of the electric field constraining the liquid crystal molecules may be represented by Ey-Ety. As such, the intensity component Ety is increased gradually as increasing the angle $\alpha$ formed between the first end electrode 8411 and the alignment direction, and the intensity (Ey-Ety) of the undesired electric field is in turn decreased gradually, thereby preventing a black disclination line region at the edge positions of the pixel unit from expending towards the inside of the pixel unit, and alleviating the problem of the nonuniform display and trace Mura in the display image.

If the angle $\alpha 1$ formed between the first end electrode 8411 and the alignment direction 20 and the angle $\beta 1$ formed between the second end electrode 8412 and the alignment direction 20 both are designed to be larger than or equal to 30° and smaller than or equal to 40°, the intensity component Ety is enough to offset the intensity of the undesired electric field and reduce the area of black disclination lines region at the edge positions of the pixel unit, thereby solving the problem of the nonuniform display and trace Mura in the display panel. Further, the angle $\alpha 1$ formed between the first end electrode 8411 and the alignment direction 20 and the angle $\beta 1$ formed between the second end electrode 8412 and the alignment direction 20 both are designed to be larger than or equal to 30° and smaller than or equal to 33°, the nonuniform display and the trace Mura in the display panel can be effectively alleviated while obtaining the better light transmittance. If the angle $\alpha 1$ formed between the first end electrode 8411 and the alignment direction 20 and the angle $\beta 1$ formed between the second end electrode 8412 and the alignment direction 20 both are designed to be 31°, the display panel can obtain the largest light transmittance. The trace Mura recovery time of the display panel is decreased to be below 1 s without sacrificing the display quality of the display panel, thereby significantly improving the nonuniform display and trace Mura of the display panel. The configurations of the third end electrode 8431 and the fourth end electrode 8432 are same with the configurations of the first end electrode 8411 and the second end electrode 8412, which is not repeated here.

It is noted that the structure of both the pixel electrode and the common electrode described above is described as an example, and both the pixel electrode and the common electrode may be designed according to the structure of the pixel unit described in reference to FIGS. 9, 10 and 11. Additionally, the pixel unit of FIG. 12 is described to be implemented in the FFS display mode, and may alternatively be implemented in the IPS display mode. The pixel electrode 44 and the common electrode 45 may further be located at the same layer, and in this case, the branch electrodes of the pixel electrode are arranged alternately with and spaced from the branch electrodes of the common electrode.

Figure 13:
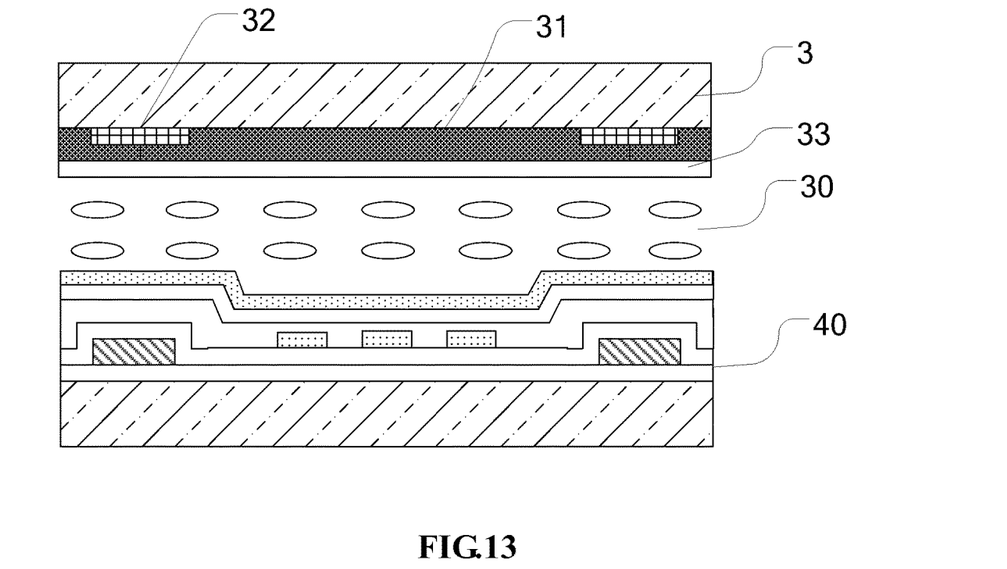
FIG. 13 is a sectional diagram of the structure of a display panel, according to embodiments of the disclosure.

FIG. 13 is a sectional diagram of the structure of a display panel, according to embodiments of the disclosure. As shown in FIG. 13, the display panel includes: an array substrate 40 described in the above embodiments, an opposite substrate 3 disposed opposite to the array substrate 40, and a liquid crystal layer 30 disposed between the array substrate and the opposite substrate 3. Black matrixes 32 are disposed on the opposite substrate 3. A color filter layer 31 is disposed between the black matrixes 32 and includes light filters for different colors, and each of the light filters corresponds to a different pixel unit. The color filter layer 31 is covered by a planarization layer. The angle formed between the alignment direction and the end electrode of the pixel unit in the array substrate is designed to be larger than or equal to 30° and smaller than 40° in order to reduce the area of black disclination lines region at the edge positions of the pixel unit and improve the light transmittance, and further decrease the intensity of the undesired electric field at the edge positions of the pixel unit, thereby effectively solving the problem of the nonuniform display and trace Mura in the display image.

Figure 14:
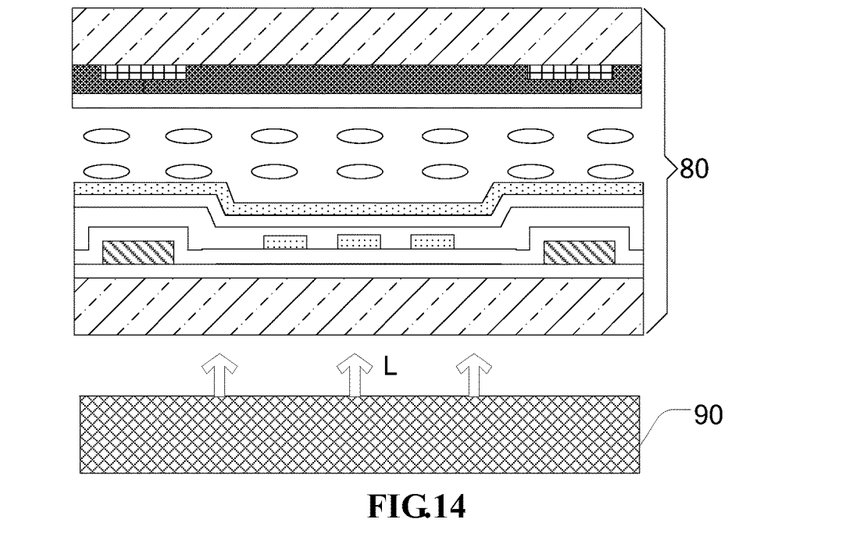
FIG. 14 is a sectional diagram of the structure of a display device, according to embodiments of the disclosure.

FIG. 14 is a sectional diagram of the structure of a display device, according to embodiments of the disclosure. As shown in FIG. 14, the display device includes: a display panel 80 described in the embodiments above and a light source device 90 disposed at one side of the display panel 80, where, the light source device 90 is configured to provide the display panel 80 with a light source L. The angle formed between the alignment direction and the end electrode of the pixel unit in the array substrate is designed to be larger than or equal to 30° and smaller than 40° in order to reduce the area of black disclination lines region at the edge positions of the pixel unit and improve the light transmittance, and further decrease the intensity of the undesired electric field at the edge positions of the pixel unit, thereby effectively solving the problem of the nonuniform display and trace Mura in the display image.

Embodiments of the array substrate, the display panel and the display device are described above. Principles of the disclosure and implementations thereof are illustrated by examples in the disclosure. The illustration of embodiments above is used to assist in understanding the methods of the disclosure and ideas thereof. Meanwhile, changes can be made by those skilled in the art according to the ideas of the disclosure without departing from the scope of protection of the disclosure. The content of the specification should not be construed as limiting the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. An array substrate, comprising:
a plurality of gate lines extending in a first direction;
a plurality of data lines extending in a second direction perpendicular to the first direction;
a plurality of pixel units each having a first electrode and a second electrode; and
an alignment layer covering the pixel units, wherein an alignment direction of the alignment layer is same as the second direction,
wherein the first electrode has a plurality of branch electrodes, each of the plurality of branch electrodes consists of one straight median electrode extending in the second direction, a first end electrode at a first end of the one median electrode, and a second end electrode at a second end of the one median electrode, the first end electrode is inclined clockwise by a first angle with respect to the alignment direction, the second end electrode is inclined anticlockwise by a second angle with respect to an opposite direction of the alignment direction,
wherein both of the first angle and the second angle are larger than or equal to 30° and smaller than or equal to 33°.

2. The array substrate according to claim 1, wherein the first electrode is a pixel electrode, the second electrode is a common electrode, and the second electrode is disposed above the first electrode.

3. The array substrate according to claim 1, wherein the first electrode is a pixel electrode, the second electrode is a common electrode, the second electrode and the plurality of data lines are arranged in a same layer.

4. The array substrate according to claim 3, wherein the first electrode is disposed above the second electrode.

5. The array substrate according to claim 1, wherein the one median electrode, the first end electrode and the second end electrode are all within a light transmitting region of the pixel unit.

6. The array substrate according to claim 1, wherein both of the first angle and the second angle are 31°.

7. The array substrate according to claim 1, wherein the first end electrodes of the plurality of branch electrodes in a same pixel unit are connected to a first connection electrode extending in the first direction, and the second end electrodes of the plurality of branch electrodes in the same pixel unit are connected to a second connection electrode that is in a substantially rectangle shape,
wherein a vertical projection of the first connection electrode is not overlapped with a vertical projection of the plurality of gate lines, and a vertical projection of the second connection electrode is not overlapped with the vertical projection of the plurality of gate lines.

8. An array substrate, comprising:
a plurality of gate lines extending in a first direction;
a plurality of data lines extending in a second direction perpendicular to the first direction;
a plurality of pixel units each having a first electrode and a second electrode; and
an alignment layer covering the pixel units, wherein an alignment direction of the alignment layer is same as the second direction, wherein the first electrode has a plurality of branch electrodes, each of the plurality of branch electrodes consists of one straight median electrode, a first end electrode at a first end of the one median electrode, and a second end electrode at a second end of the one median electrode, wherein the first end electrodes of the plurality of branch electrodes in a same pixel unit are connected to a first connection electrode extending in the first direction, and the second end electrodes of the plurality of branch electrodes in the same pixel unit are connected to a second connection electrode that is in a substantially rectangle shape, and wherein a vertical projection of the first connection electrode is not overlapped with a vertical projection of the plurality of gate lines, and a vertical projection of the second connection electrode is not overlapped with the vertical projection of the plurality of gate lines, wherein the plurality of pixel units comprise a first pixel unit and a second pixel unit that is adjacent to the first pixel unit and spaced apart from the first pixel unit by a respective one of the plurality of gate lines, the first end electrode of the first pixel unit is inclined clockwise by a first angle with respect to the alignment direction, the one median electrode of the first pixel unit is inclined clockwise by a second angle with respect to the alignment direction, and the second end electrode of the first pixel unit is parallel to the first end electrode of the first pixel unit, the first end electrode of the second pixel unit is inclined anticlockwise by a third angle with respect to the opposite direction of the alignment direction, the one median electrode of the second pixel unit is inclined anticlockwise by a fourth angle with respect to the opposite direction of the alignment direction, and the second end electrode of the second pixel unit is parallel to the first end electrode of the second pixel unit, both of the first angle and the third angle are larger than or equal to 30° and smaller than or equal to 33°.

9. The array substrate according to claim 8, wherein the first electrode is a pixel electrode, the second electrode is a common electrode, and the second electrode is disposed above the first electrode.

10. The array substrate according to claim 8, wherein the first electrode is a pixel electrode, the second electrode is a common electrode, the second electrode and the plurality of data lines are arranged in a same layer.

11. The array substrate according to claim 10, wherein the first electrode is disposed above the second electrode.

12. The array substrate according to claim 8, wherein the one median electrode, the first end electrode and the second end electrode are all within a light transmitting region of the pixel unit.

13. The array substrate according to claim 8, wherein both of the first angle and the third angle are 31°.

14. The array substrate according to claim 8, wherein the plurality of data lines are straight.

15. A display panel, comprising: an array substrate, a counter substrate disposed opposite to the array substrate, and a liquid crystal layer disposed between the array substrate and the counter substrate, wherein the counter substrate comprises a black matrix disposed on a surface of the counter substrate facing the an array substrate;

wherein the array substrate comprises:

a plurality of gate lines extending in a first direction;

a plurality of data lines extending in a second direction perpendicular to the first direction;

a plurality of pixel units each having a first electrode and a second electrode; and an alignment layer covering the pixel units, wherein an alignment direction of the alignment layer is same as the second direction, wherein the first electrode has a plurality of branch electrodes, each of the plurality of branch electrodes consists of one straight median electrode, a first end electrode at a first end of the one median electrode, and a second end electrode at a second end of the one median electrode, wherein the first end electrodes of the plurality of branch electrodes in a same pixel unit are connected to a first connection electrode extending in the first direction, and the second end electrodes of the plurality of branch electrodes in the same pixel unit are connected to a second connection electrode that is in a substantially rectangle shape, and wherein a vertical projection of the first connection electrode is not overlapped with a vertical projection of the plurality of gate lines, and a vertical projection of the second connection electrode is not overlapped with the vertical projection of the plurality of gate lines, wherein the plurality of pixel units comprise a first pixel unit and a second pixel unit that is adjacent to the first pixel unit and spaced apart from the first pixel unit by a respective one of the plurality of gate lines, the first end electrode of the first pixel unit is inclined clockwise by a first angle with respect to the alignment direction, the one median electrode of the first pixel unit is inclined clockwise by a second angle with respect to the alignment direction, and the second end electrode of the first pixel unit is parallel to the first end electrode of the first pixel unit, the first end electrode of the second pixel unit is inclined anticlockwise by a third angle with respect to the opposite direction of the alignment direction, the one median electrode of the second pixel unit is inclined anticlockwise by a fourth angle with respect to the opposite direction of the alignment direction, and the second end electrode of the second pixel unit is parallel to the first end electrode of the second pixel unit, both of the first angle and the third angle are larger than or equal to 30° and smaller than or equal to 33°.

16. The display panel according to claim 15, wherein the first electrode is a pixel electrode, the second electrode is a common electrode, and the second electrode is disposed above the first electrode.

17. The display panel according to claim 15, wherein the first electrode is a pixel electrode, the second electrode is a common electrode, the second electrode and the plurality of data lines are arranged in a same layer.

18. The display panel according to claim 17, wherein the first electrode is disposed above the second electrode.

19. The display panel according to claim 15, wherein a vertical projection of the black matrix is not overlapped with vertical projections of the first end electrode and the second end electrode of each of the plurality of branch electrodes.

20. The display panel according to claim 15, wherein both of the first angle and the third angle are 31°.

* * * * *